(12) United States Patent
Yamaoka et al.

(10) Patent No.: US 11,812,693 B2
(45) Date of Patent: Nov. 14, 2023

(54) HAND-PROPELLED POWER TOOL

(71) Applicant: Nanjing Chervon Industry Co., Ltd., Nanjing (CN)

(72) Inventors: Toshinari Yamaoka, Nanjing (CN); Qi Zhang, Nanjing (CN); Fangjie Nie, Nanjing (CN); Shichang Fu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 542 days.

(21) Appl. No.: 16/922,254

(22) Filed: Jul. 7, 2020

(65) Prior Publication Data
US 2021/0015038 A1    Jan. 21, 2021

(30) Foreign Application Priority Data

Jul. 16, 2019  (CN) .......................... 201910641003.6
Apr. 8, 2020   (CN) .......................... 202010268485.8
Apr. 8, 2020   (CN) .......................... 202010268685.3

(51) Int. Cl.
*A01D 34/82*   (2006.01)
*A01D 34/68*   (2006.01)
*B62B 5/06*    (2006.01)
*A01D 101/00*  (2006.01)

(52) U.S. Cl.
CPC .......... *A01D 34/824* (2013.01); *A01D 34/68* (2013.01); *B62B 5/064* (2013.01); *A01D 2101/00* (2013.01)

(58) Field of Classification Search
CPC .. A01D 34/824; A01D 34/68; A01D 2101/00; B62B 5/064

USPC .......................................................... 16/110
See application file for complete search history.

(56) References Cited

U.S. PATENT DOCUMENTS

| | | | | |
|---|---|---|---|---|
| 11,013,173 B2* | 5/2021 | Curtis | ................. | A01D 34/824 |
| 2018/0116119 A1* | 5/2018 | Wu | ........................ | F16H 59/041 |
| 2018/0228089 A1* | 8/2018 | Yamaoka | ........... | A01D 34/6806 |
| 2019/0230852 A1* | 8/2019 | Curtis | ................ | A01D 34/6806 |

FOREIGN PATENT DOCUMENTS

| | | | | | |
|---|---|---|---|---|---|
| CN | 205546535 U | * | 9/2016 | ............. | A01D 34/67 |
| CN | 206749972 U | | 12/2017 | | |
| CN | 208663497 U | | 3/2019 | | |
| DE | 202013100775 U1 | * | 8/2013 | ........... | A01D 34/824 |
| EP | 2684439 A1 | * | 1/2014 | ............. | A01D 34/74 |
| FR | 2723504 A1 | * | 2/1996 | ........... | A01D 34/824 |

* cited by examiner

*Primary Examiner* — Mahmoud Gimie
(74) *Attorney, Agent, or Firm* — Greenberg Traurig, LLP

(57) ABSTRACT

A hand-propelled power tool includes a main body and a handle device connected to the main body. The handle device includes a rod body connected to the main body extending along a first straight line and an adjustment assembly connected to the rod body comprising an operating piece capable of sliding along the first straight line relative to the rod body. The adjustment assembly has a locked state and an unlocked state, the operating piece is operative to slide along the rod body to switch the adjustment assembly between the locked state and the unlocked state, when the adjustment assembly is in the unlocked state, the handle device is operative to rotate relative to the main body, and, when the adjustment assembly is in the locked state, the handle device is fixedly connected to the main body.

20 Claims, 17 Drawing Sheets

HAND-PROPELLED POWER TOOL

RELATED APPLICATION INFORMATION

This application claims the benefit under 35 U.S.C. § 119(a) of Chinese Patent Application No. CN 201910641003.6, filed on Jul. 16, 2019, Chinese Patent Application No. CN 202010268685.3, filed on Apr. 8, 2020, and Chinese Patent Application No. CN 202010268485.8, filed on Apr. 8, 2020, each of which is incorporated by reference in its entirety herein.

BACKGROUND

The following relates to power machinery, and more particularly relates to a hand-propelled power tool.

A hand-propelled power tool includes a handle device used for pushing the tool by hand. Typically, the handle device is rotatable relative to the main body of the hand-propelled power tool. Different working conditions and different operators have different requirements on the angle of the handle device relative to the main body, and so the angle of the handle device relative to the main body needs to be adjustable, and the ease and convenience of adjustment greatly influence the working efficiency of the hand-propelled power tool.

SUMMARY

In one disclosed example, a hand-propelled power tool includes a main body; and a handle device connected to the main body and configured to be operated; wherein the handle device comprises: a rod body connected to the main body, wherein the rod body at least partially extends along a first straight line; and an adjustment assembly connected to the rod body and comprising an operating piece capable of sliding along the first straight line relative to the rod body; wherein the adjustment assembly comprises a locked state and an unlocked state relative to the rod body, the operating piece is operative to slide along the rod body to switch the adjustment assembly between the locked state and the unlocked state; and wherein when the adjustment assembly is in the unlocked state, the handle device is operative to rotate relative to the main body about an axis, and when the adjustment assembly is in the locked state, the handle device is fixedly connected to the main body.

In a further example, a hand-propelled power tool includes a main body; and a handle device connected to the main body and configured to be operated; wherein the handle device comprises: a rod body connected to the main body; and an adjustment assembly connected to the rod body and comprising an operating piece capable of sliding relative to the rod body; wherein the adjustment assembly comprises a locked state and an unlocked state relative to the rod body, the operating piece is operative to slide along the rod body to switch the adjustment assembly between the locked state and the unlocked state; and wherein when the adjustment assembly is in the unlocked state, the handle device is operative to rotate relative to the main body about an axis, and when the adjustment assembly is in the locked state, the handle device is fixedly connected to the main body.

In a further example, a hand-propelled power tool includes a main body; and a handle device connected to the main body and configured to be operated; wherein the handle device comprises: a rod body connected to the main body, wherein the rod body at least partially extends along a first straight line; and an adjustment assembly connected to the rod body and comprising an operating piece capable of rotating around the first straight line relative to the rod body; wherein the adjustment assembly comprises a locked state and an unlocked state relative to the rod body, the operating piece is operative to rotate around the first straight line to switch the adjustment assembly between the locked state and the unlocked state; and wherein when the adjustment assembly is in the unlocked state, the handle device is operative to rotate relative to the main body about an axis, and when the adjustment assembly is in the locked state, the handle device is fixedly connected to the main body.

DETAILED DESCRIPTION

Figure 1:
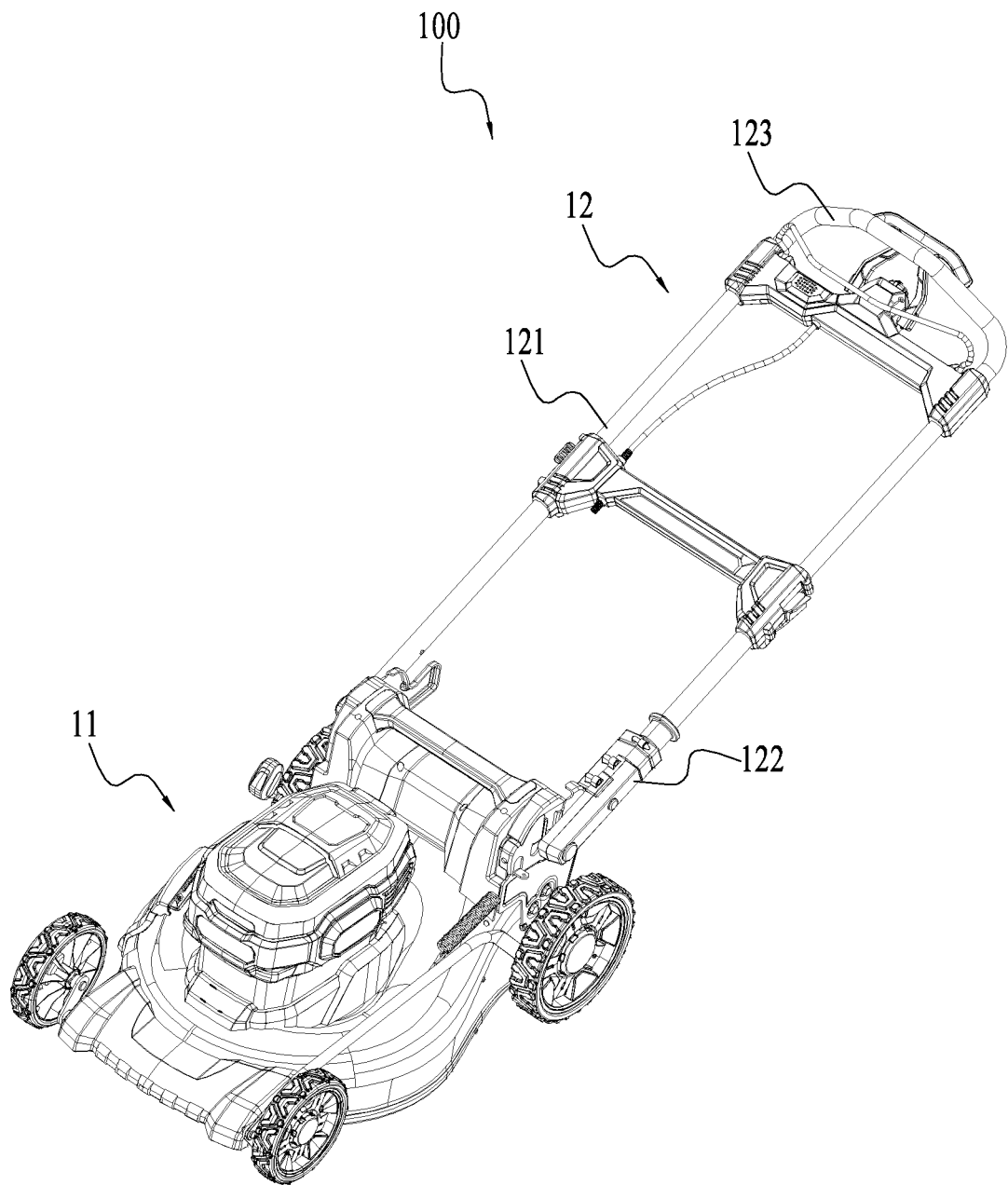
FIG. 1 is a schematic diagram of a hand-propelled power tool according to a first example.

A hand-propelled power tool 100 illustrated in FIG. 1 is a hand-propelled lawnmower. Of course, the hand-propelled power tool 100 may also be other hand-propelled power tools, such as a snowplow, a cart or the like. As long as substantial content in the following description is included, it is intended to fall within the protection scope of the appended claims.

Figure 2:
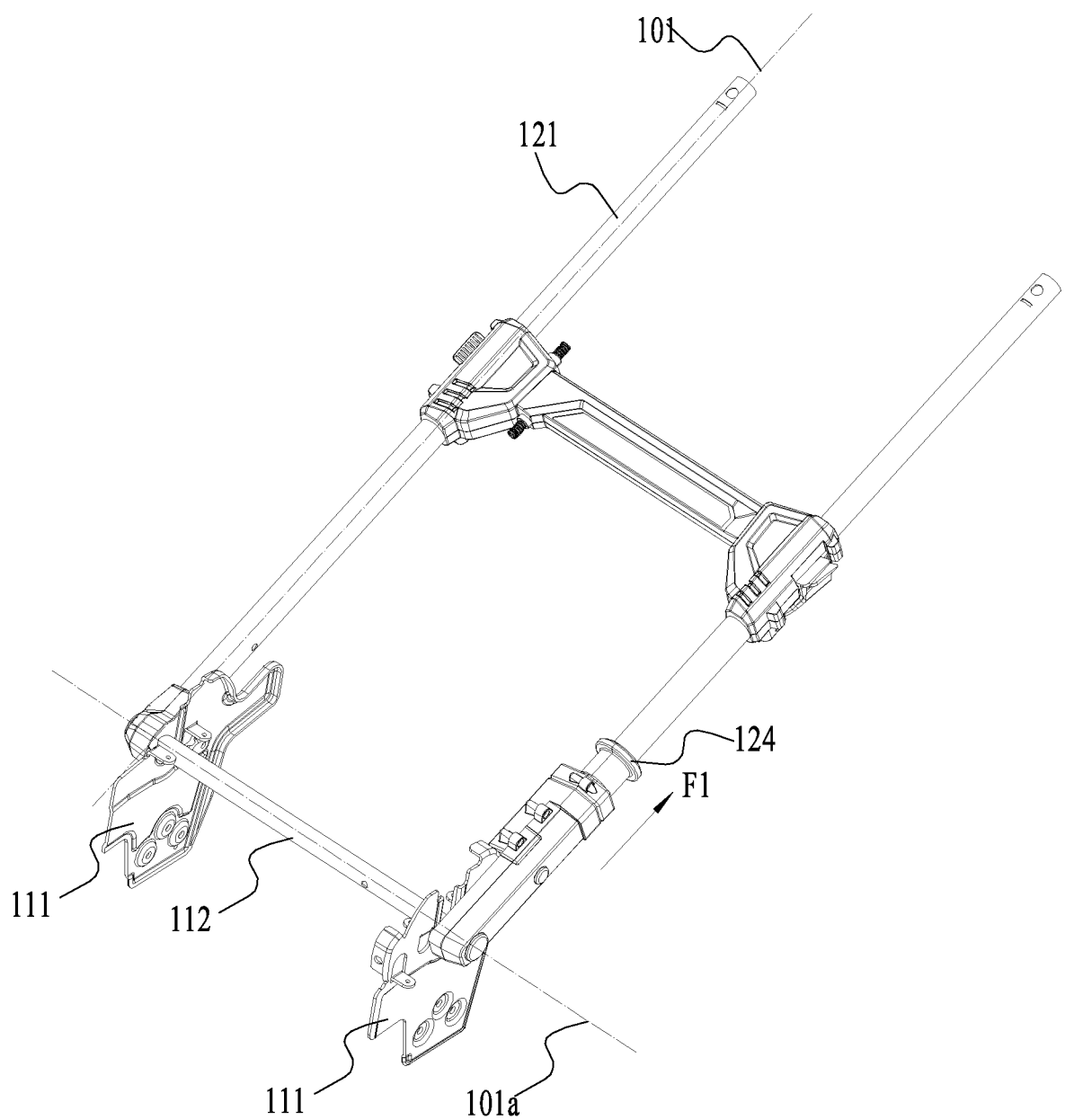
FIG. 2 is a perspective view of a partial structure of a handle device and main body of the hand-propelled power tool of FIG. 1, where an adjustment assembly is in a locked state.
Figure 3:
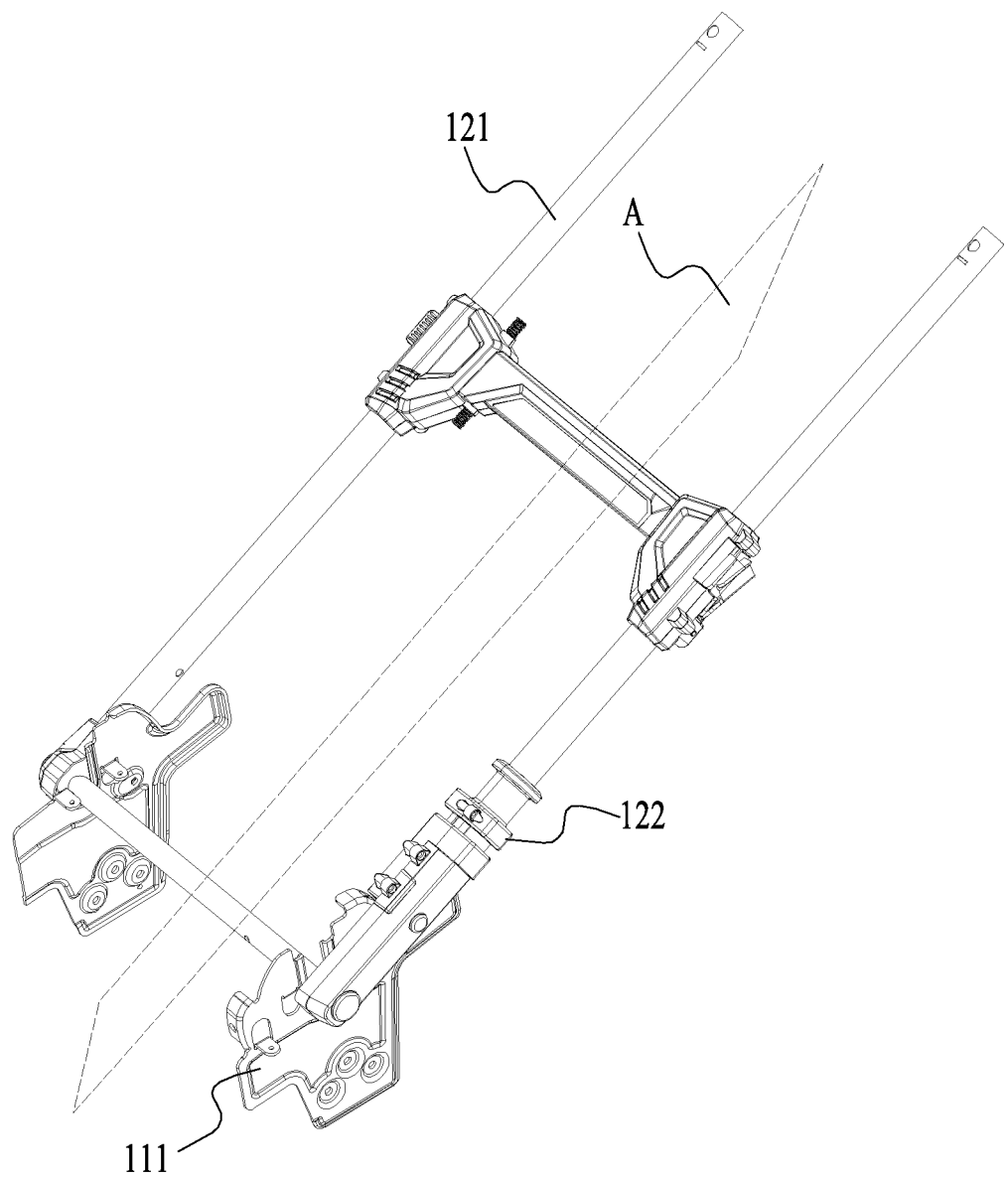
FIG. 3 is a perspective view of a partial structure of a handle device and main body of the hand-propelled power tool of FIG. 1, where an adjustment assembly is in an unlocked state.

As illustrated in FIG. 1 to FIG. 3, the hand-propelled power tool 100 includes a main body 11 and a handle device 12, and the handle device 12 is connected to the main body 11 to form a whole hand-propelled power tool 100. The handle device 12 includes a rod body 121 and an adjustment assembly 122, and the rod body 121 substantially extends in a first straight line 101. The rod body 121 is used for connecting the main body 11, and at least partially extends in the direction of the first straight line 101. It is to be noted that the portion of the rod body 121 may extend in a straight line or in a curve. In this example, the rod body 121 is composed of a plurality telescopically connected rods and connecting assemblies. The handle device 12 may further include a grip portion 123 for a user to grip, and the grip portion 123 may be integrally formed with the rod body 121 or connected to the rod body 121.

The adjustment assembly 122 is slidably connected to the rod body 121, and the adjustment assembly 122 has a locked state and an unlocked state relative to the rod body 121. When the adjustment assembly 122 is in the unlocked state, the handle device 12 can rotate relative to the main body 11 with a first axis as a rotational axis. When the adjustment assembly 122 is in the locked state, the handle device 12 is fixedly connected to the main body 11. Specifically, the adjustment assembly 122 is mounted onto a surface of the rod body 121, the adjustment assembly 122 can slide in the direction of the first straight line 101 relative to the rod body 121, and at least two different positions are on the adjustment assembly 122 relative to the rod body 121 and correspond to the locked state and the unlocked state of the adjustment assembly 122 respectively. In this example, the adjustment assembly 122 can slide back and forth in the direction of the first straight line 101 relative to the rod body 121. In this process, the adjustment assembly 122 has a plurality of different positions relative to the rod body 121, and the plurality of different positions each correspond to the locked state or the unlocked state.

The adjustment assembly 122 in FIG. 2 and the adjustment assembly 122 FIG. 3 are in the locked state and the unlocked state relative to the rod body 121 respectively. The adjustment assembly 122 is disposed on an end of the rod body 121 facing towards the main body 11. As illustrated in FIG. 2, when the user applies an upward driving force F1 in the direction of the first straight line 101 to the adjustment assembly 122, the adjustment assembly 122 slides a certain distance in a direction shown by an arrow in FIG. 2 to a position shown in FIG. 3, and the adjusting assembly 122 switches from the locked state to the unlocked state. At this time the handle device 12 can rotate relative to the main body 11 with the first axis 101a as the rotational axis, and if the driving force F1 is withdrawn, the adjustment assembly 122 is reset from the position shown in FIG. 3 to a position illustrated in FIG. 2.

Figure 4:
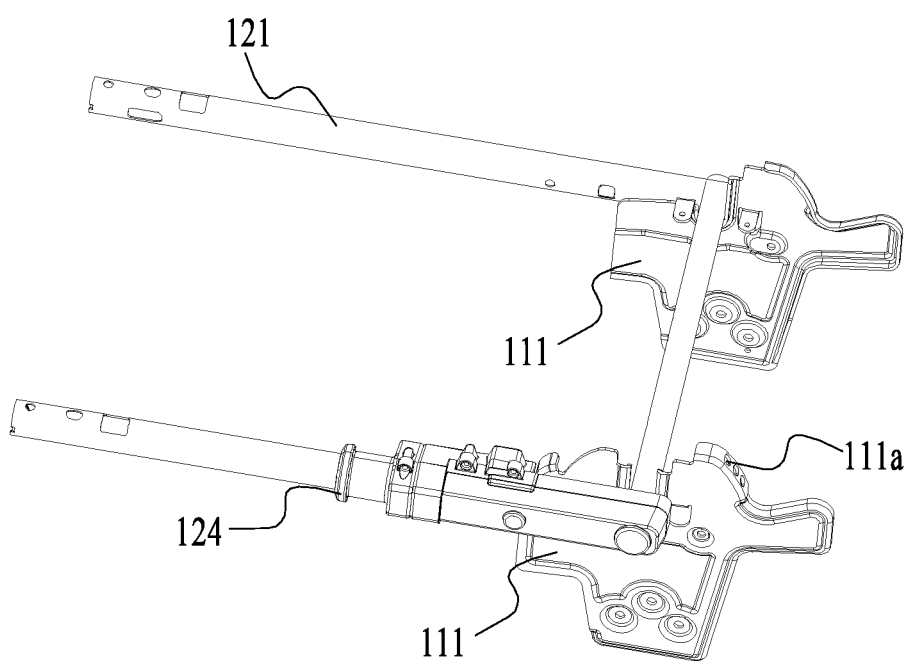
FIG. 4 is a perspective view of a partial structure of a handle device and main body of the hand-propelled power tool of FIG. 1.
Figure 5:
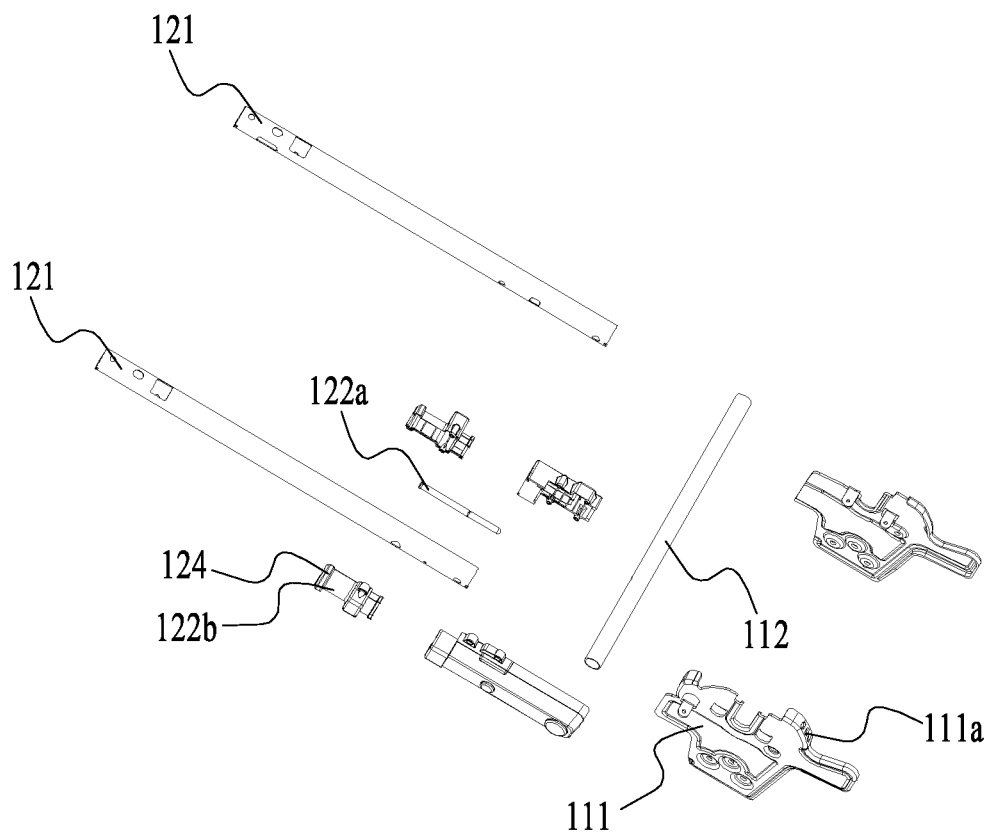
FIG. 5 is an exploded view of a partial structure of a handle device and main body of the hand-propelled power tool of FIG. 1.
Figure 6:
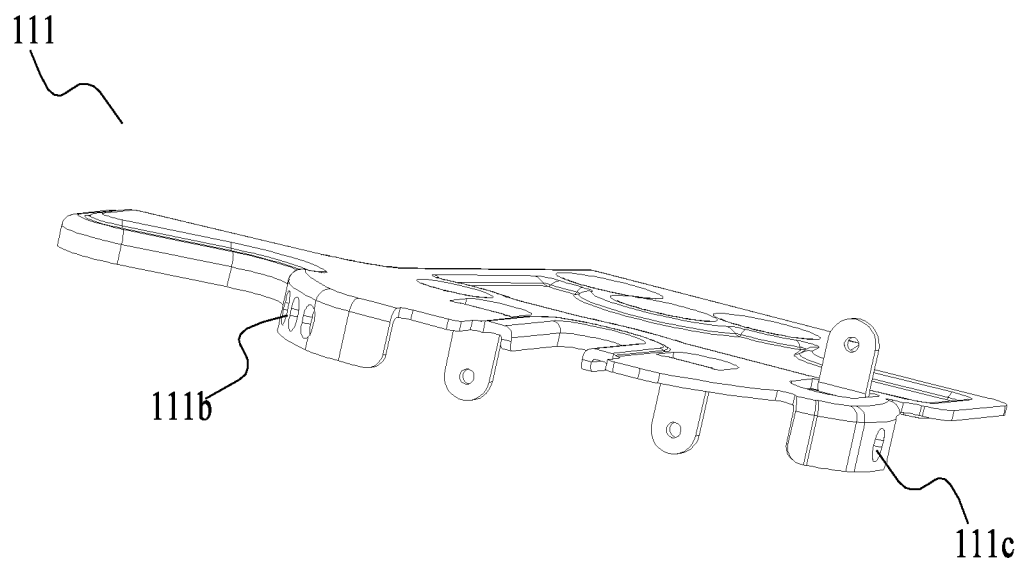
FIG. 6 is a perspective view of a partial structure of a main body of the hand-propelled power tool of FIG. 1.

As illustrated in FIG. 4 to FIG. 5, the adjustment assembly 122 includes a connector 122a movably connected to the main body 11. The handle device 12 includes an operating assembly 124 for operation by the user to drive the connector 122a to move. In this example, the connector 122a is slidably connected to the main body 11. In this example, the adjustment assembly 122 includes a casing 122b, the connector 122a is fixedly connected to the casing 122b in the direction of the first straight line 101, and the operating assembly 124 is disposed on the casing 122b. The connector 122a is slidably connected to the main body 11 in the direction of the first straight line 101. Specifically, the connector 122a is an insertion bolt, and is at least partially disposed outside the casing 122b. The main body 11 is provided with a matching portion 111a operative to be engaged with the connector 122a, and in this example, the matching portion 111a may specifically be a hole that fits with the insertion bolt to form a shaft-hole-fitting. In this example, the main body 11 is provided with an independent matching piece 111 operative to be engaged with the connector 122a, and the matching piece 111 is fixedly connected to an axle or a chassis 113. When the user operates the operating assembly 124 so that the adjustment assembly 122 moves in the direction of the first straight line 101, the connector 122a may slide relative to the matching portion 111a.

The rod body 121 has a middle plane A, and the rod body 121 is substantially symmetrical about the middle plane A. The operating assembly 124 is disposed on only one side of the middle plane A. The connector 122a is disposed on only one side of the middle plane A. That is to say, only one side of the rod body 121 is provided with the adjustment assembly 122. The user only needs to operate once to lock or unlock the handle device 12, thereby simplifying the structure and facilitating the actual operation.

As an optional implementation, the rod body has the middle plane and is symmetrical about the middle plane. The operating assembly 124 is disposed on only one side of the middle plane. A least two connectors are disposed on two sides of the middle plane respectively and form linkage with each other. That is to say, two sides of the middle plane of the rod body are provided with connectors which are slidably connected to the main body, such that control of the handle device by the adjustment assembly is more stable. Similarly, the operating assembly is only disposed on one side, and the user only needs to operate the operating assembly on one side to trigger movement of the connectors on two sides, thus being more convenient for an operator to operate.

As another optional implementation, the rod body has the middle plane and is symmetrical about the middle plane. At least two operating assemblies are disposed on two sides of the middle plane respectively. A least two connectors are disposed on two sides of the middle plane respectively. That is to say, at least two sets of adjustment assemblies are disposed on two sides of the middle plane of the rod body respectively. Preferably, the at least two sets of adjustment assemblies are independent respectively and do not form linkage; and the at least two set of adjustment assemblies are disposed symmetrically relative to the middle plane. Under this structural design, the user needs to ensure that the adjustment assemblies on two sides of the middle plane are both in the unlocked state before the handle device can rotate relative to the main body. This design makes the adjustment of the handle device more secure.

The main body 11 is formed with at least two matching portions 111a which are operative to be engaged with the connector 122a. The at least two matching portions 111a are disposed on different positions of the main body 11. In this example, the matching piece 111 is formed with two groups of matching portions, a working matching group 111b and a folding matching group 111c. The working matching group 111b includes at least two matching portions 111a at different positions, and is used for being engaged with the connector 122a during normal operation of the hand-propelled power tool 100. The folding matching group 111c includes at least one matching portion 111a and is used for being engaged with the connector 122a when the hand-propelled power tool 100 needs to fold and store the handle device 12 in a non-operating state.

Specifically, the main body 11 includes a rotation shaft 112, the rod body 121 is rotatably connected to the rotation shaft 112, and the matching piece 11 is fixed to the chassis 113. When the hand-propelled power tool 100 is in the working state, the adjustment assembly 122 may be adjusted such that the handle device 12 is rotated to a suitable position relative to the main body 11, and such that the connector 122a is operative to be engaged with one matching portion 111a in the working matching group 111b. When the hand-propelled power tool 100 is folded, the adjustment assembly 122 may be adjusted such that the handle device 12 is rotated to a suitable position relative to the main body 11, and such that the connector 122a is operative to be engaged with the matching portion 111a in the folding matching group 111c.

Figure 7:
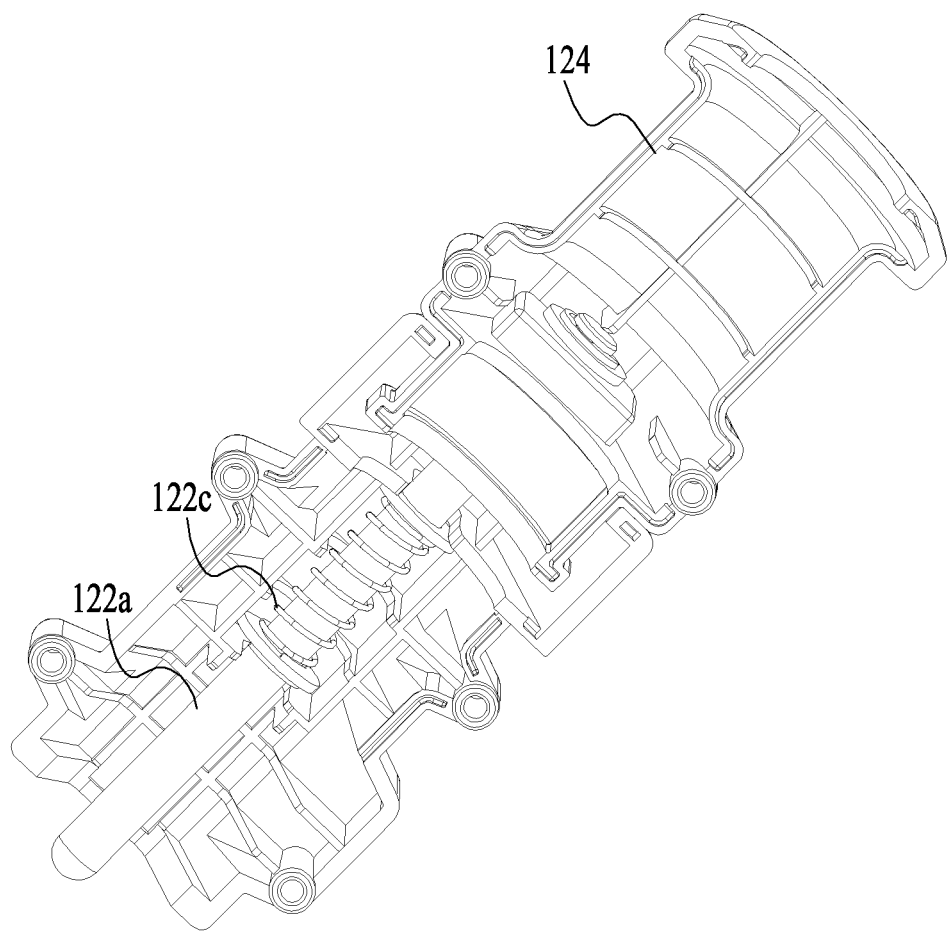
FIG. 7 is a perspective view of a partial structure of an adjustment assembly of the hand-propelled power tool of FIG. 1.
Figure 8:
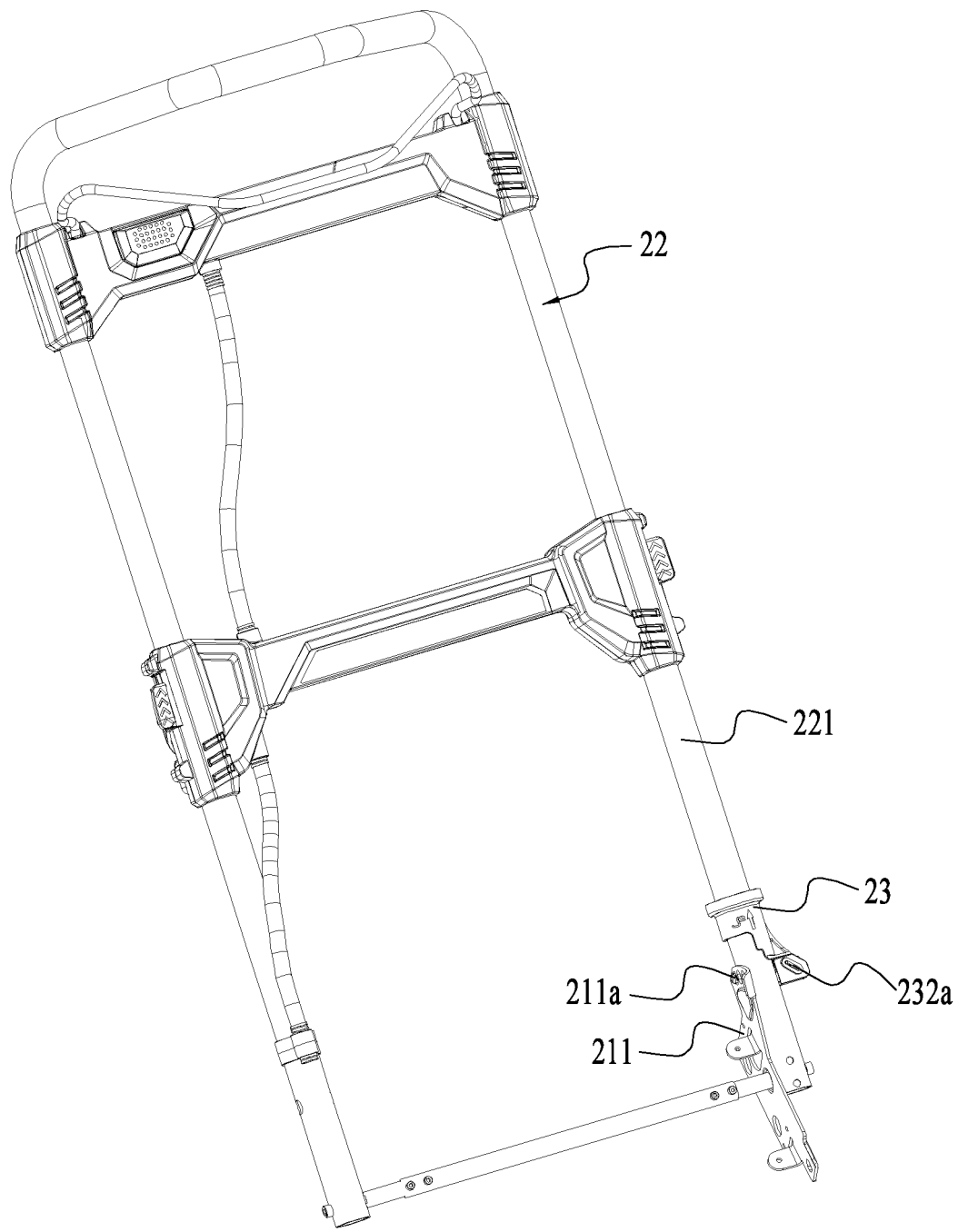
FIG. 8 is a schematic diagram of a portion of a hand-propelled power tool when an adjustment assembly of the hand-propelled power tool is in a locked state according to a second example.
Figure 9:
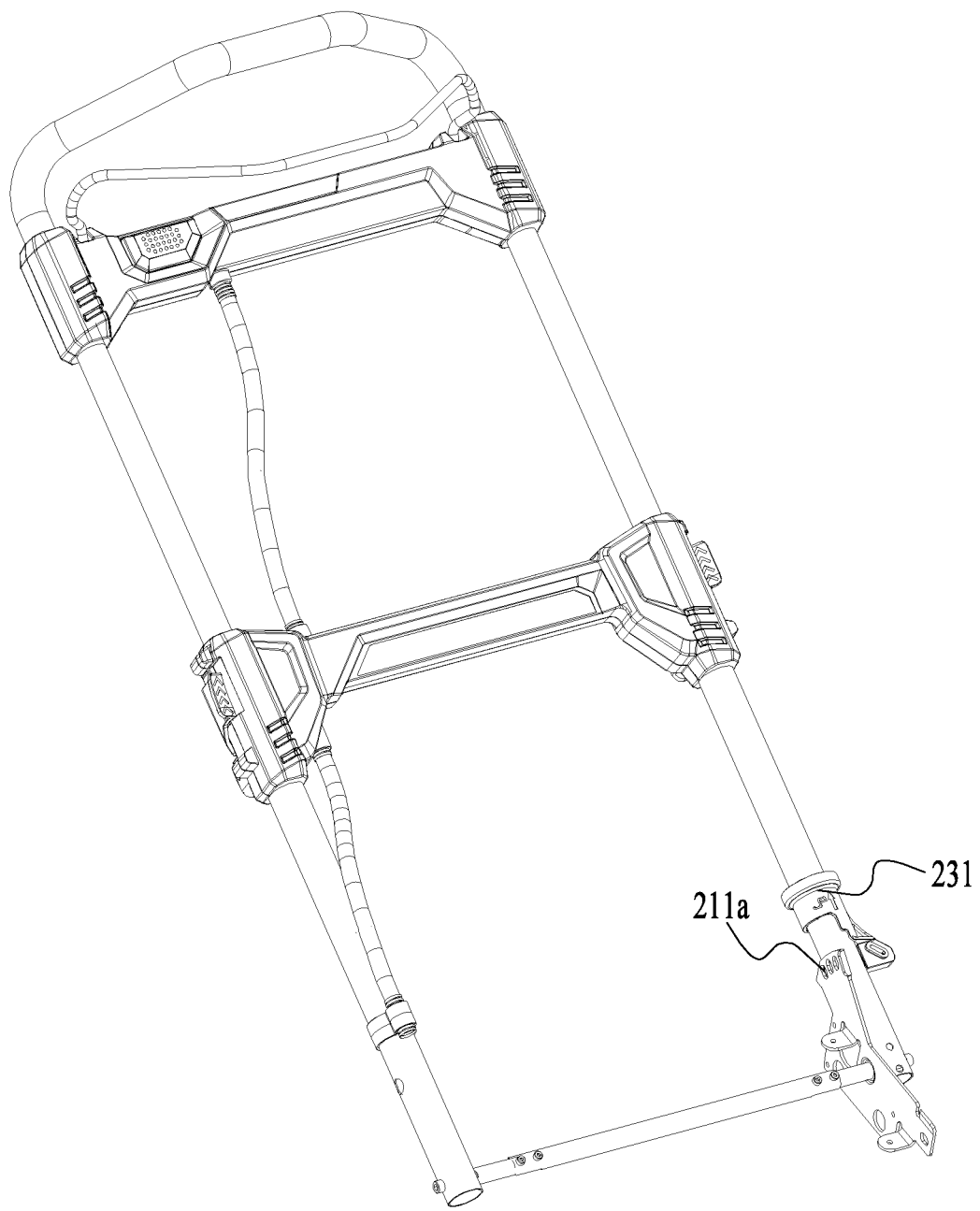
FIG. 9 is a schematic diagram of the portion of the hand-propelled power tool when the adjustment assembly is in an unlocked state according to the second example of FIG. 8.
Figure 10:
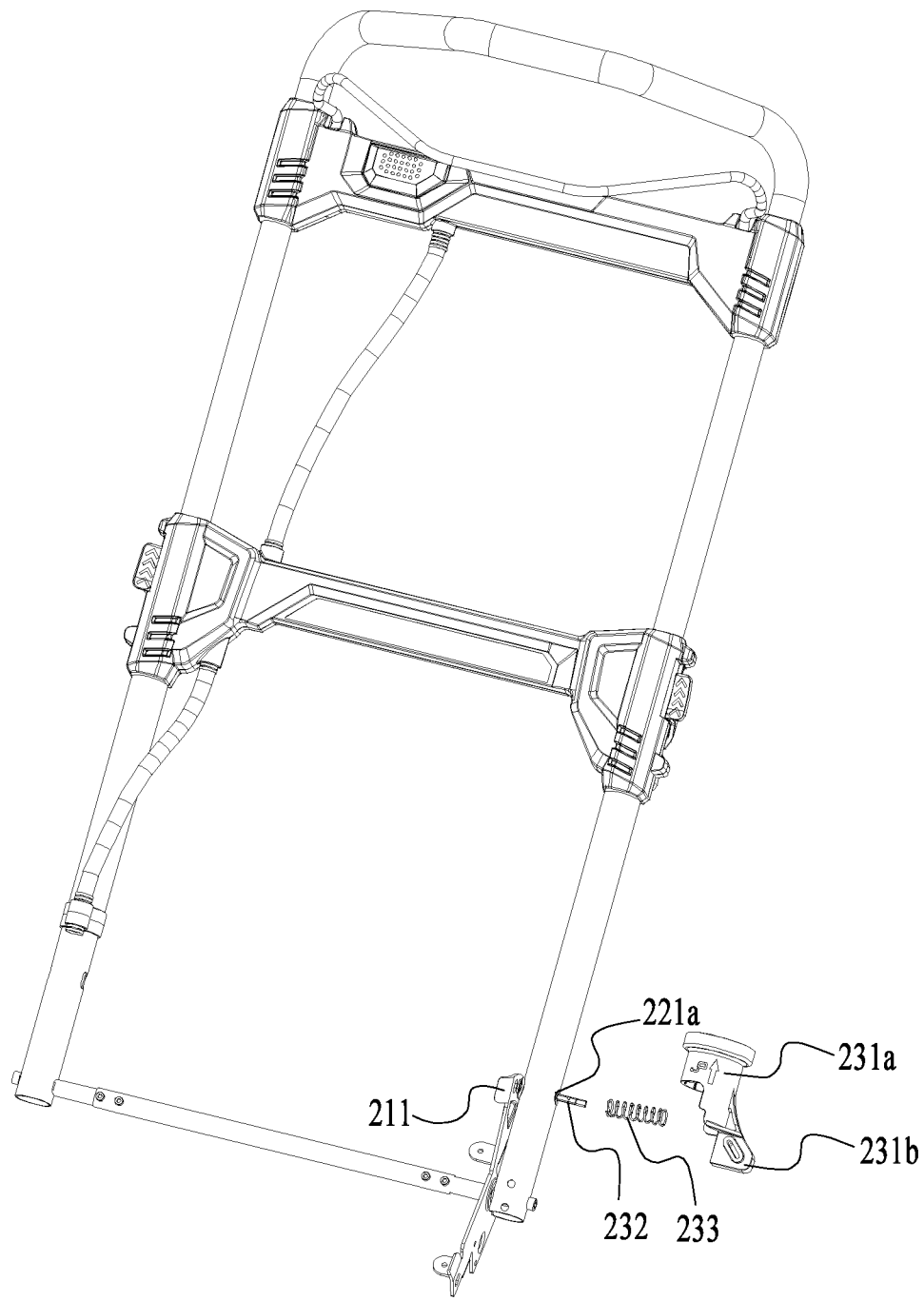
FIG. 10 is a schematic diagram of the portion of the hand-propelled power tool when the adjustment assembly is partially exploded according to the second example of the FIG. 8.
Figure 11:
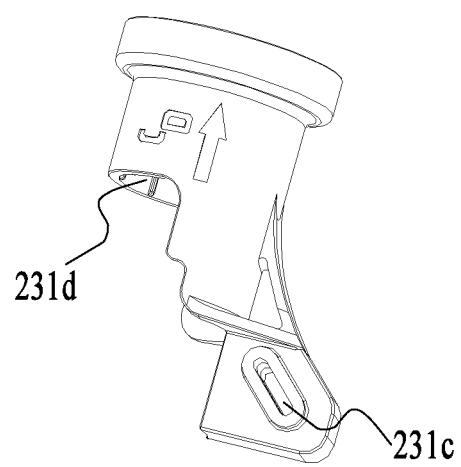
FIG. 11 is an operating piece of the hand-propelled power of the FIG. 8.

As illustrated in FIG. 7, the adjustment assembly 122 further includes a first elastic piece 122c connected to the connector 122a or the operating assembly 124. In this example, the first elastic piece 122c is connected to the connector 122a, when the user applies a driving force in the direction of the first straight line 101 to an operating piece, the connector 122a moves accordingly, and the first elastic piece 122c is elastically deformed under driving of the connector 122a. When the driving force is withdrawn, the connector 122a is reset to an original position under an elastic force of the first elastic piece 122c, that is, the adjustment assembly 122 is restored to a locked position. Specifically, the first elastic piece 122c is a spring and is fitted over a surface of the connector 122a.

FIGS. 8 to 11 illustrate a hand-propelled power tool in a second example, where the hand-propelled power tool also includes the handle device 22 and the main body 21. FIGS. 8 to 11 illustrate only part of the structure of the handle device 22 and the main body 21. The hand-propelled power tool in this example is different from the first example in that a structure of the adjustment assembly 23 and an adjustment manner of the adjustment assembly 23 relative to the handle device 22 are different, and similarities with the first example are applied to this example.

The adjustment assembly 23 is described in detail below. In this example, the adjustment assembly 23 includes an operating piece 231 distributed substantially around the rod body 221. The adjustment assembly 23 further includes a locking pin 232 operative to be engaged with the operating piece 231. The operating piece 231 is formed with an operating portion 231a operable by an operator and a driving portion 231b for driving the locking pin 232 to lock or unlock the rotation of the handle device 22 relative to the main body. The main body 21 is provided with a matching piece 211 operative to be engaged with the locking pin 232. The operating piece 231 includes a through hole 231d through which the rod body 221 can pass, and the operating portion 231a is distributed around a position of the through hole 231d. Specifically, the operating piece 231 is fitted over the rod body 221 and can slide along the rod body 221, and can switch between a locked position and an unlocked position. The rod body 221 is formed with a first through hole 221a through which the locking pin 232 can pass, and the matching piece 211 is formed with a second through hole 211a through which the locking pin 232 can pass. When the locking pin 232 passes both the first through hole 221a and the second through hole 211a, the handle device 22 is locked to the matching piece 211. A second elastic piece 233 is further fitted on the locking pin 232, and the second elastic piece 233 is disposed in the first through hole 221a. When the locking pin 232 is disengaged from the second through hole 211a, the second elastic piece 233 is compressed. When the second elastic piece 233 releases the elastic force, the locking pin 232 quickly enters the second through hole 211a. When the locking pin 232 is disengaged from the second through hole 211a, the handle device 22 can be freely rotated around the main body 21, thereby adjusting to a preset position. The matching piece 211 is provided with a plurality of second through holes 211a, such that the handle device 22 can be locked at a plurality of positions.

The driving portion 231b is disposed on one side of the operating portion 231a, and is formed with a driving groove 231c through which the locking pin 232 can pass. Specifically, the driving groove 231c is obliquely distributed relative to an extending direction of the rod body 221. As an implementation, the locking pin 232 is further provided with a driving pin 232a perpendicular to or intersecting with the locking pin 232, and both the locking pin 232 and the driving pin 232a are disposed in the driving groove 231c. When the operating piece 231 moves along the rod body 221, the driving groove 231c is operative to drive the driving pin 232a to slide in the driving groove 231c, and a movement form of the driving pin 232a at this time is a combined movement along the extending direction of the rod body 221 and perpendicular to the extending direction of the rod body 221. A partial movement of the driving pin 232a in a direction perpendicular to the extending direction of the rod body 221 can drive the locking pin 232 into or out of the second through hole 211a. As an implementation, when a driving portion moves in a first direction, the locking pin 232 can be driven out of the second through hole 211a, and at this time, the handle device 22 is unlocked and can rotate around the main body 21. When the driving portion moves in a second direction, the locking pin 232 can be driven into the second through hole 211a, and at this time, the handle device 22 is locked to the matching piece 211.

Figure 12:
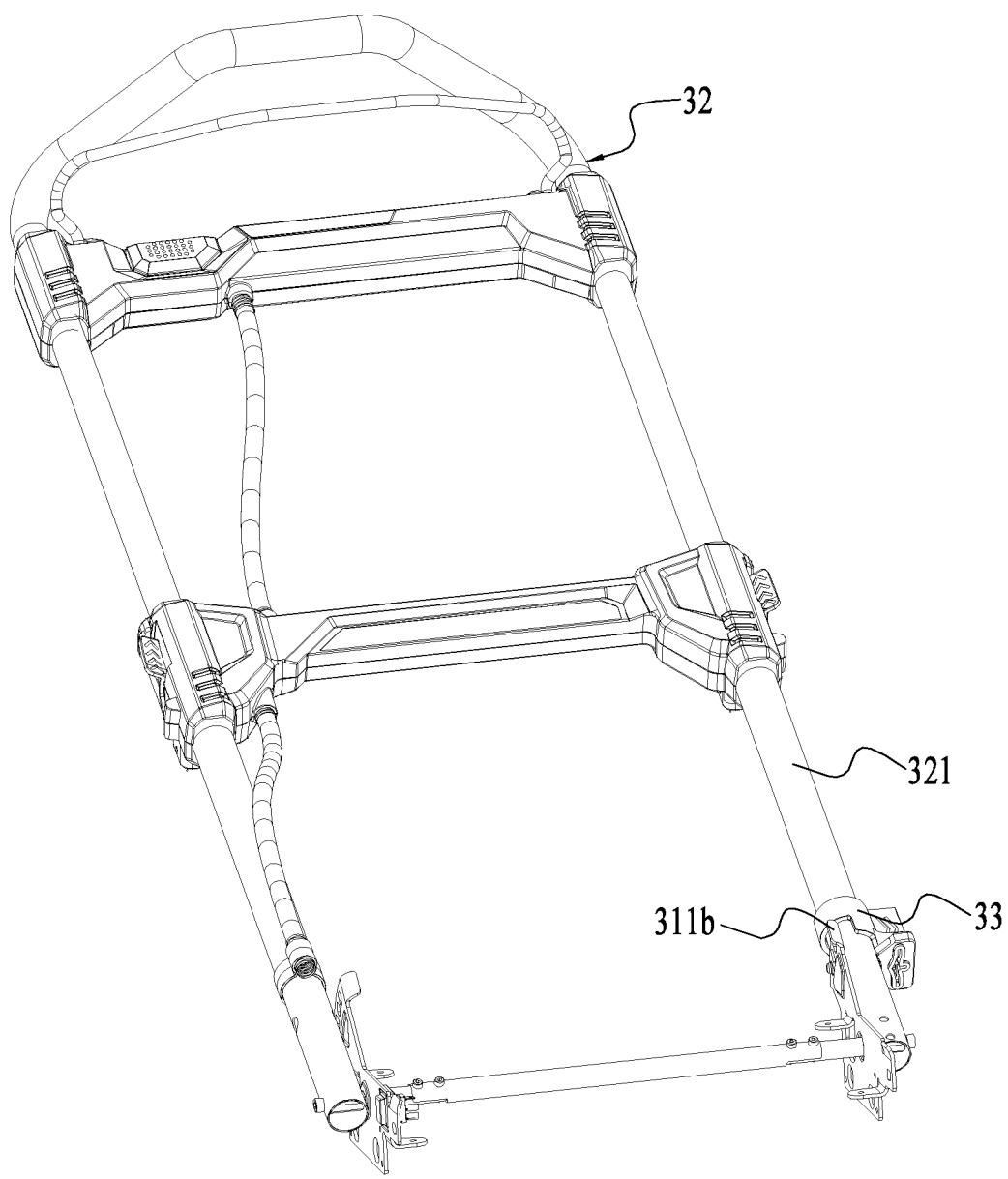
FIG. 12 is a schematic diagram of a portion of a hand-propelled power tool when an adjustment assembly of the hand-propelled power tool is in a locked state according to a third example.
Figure 13:
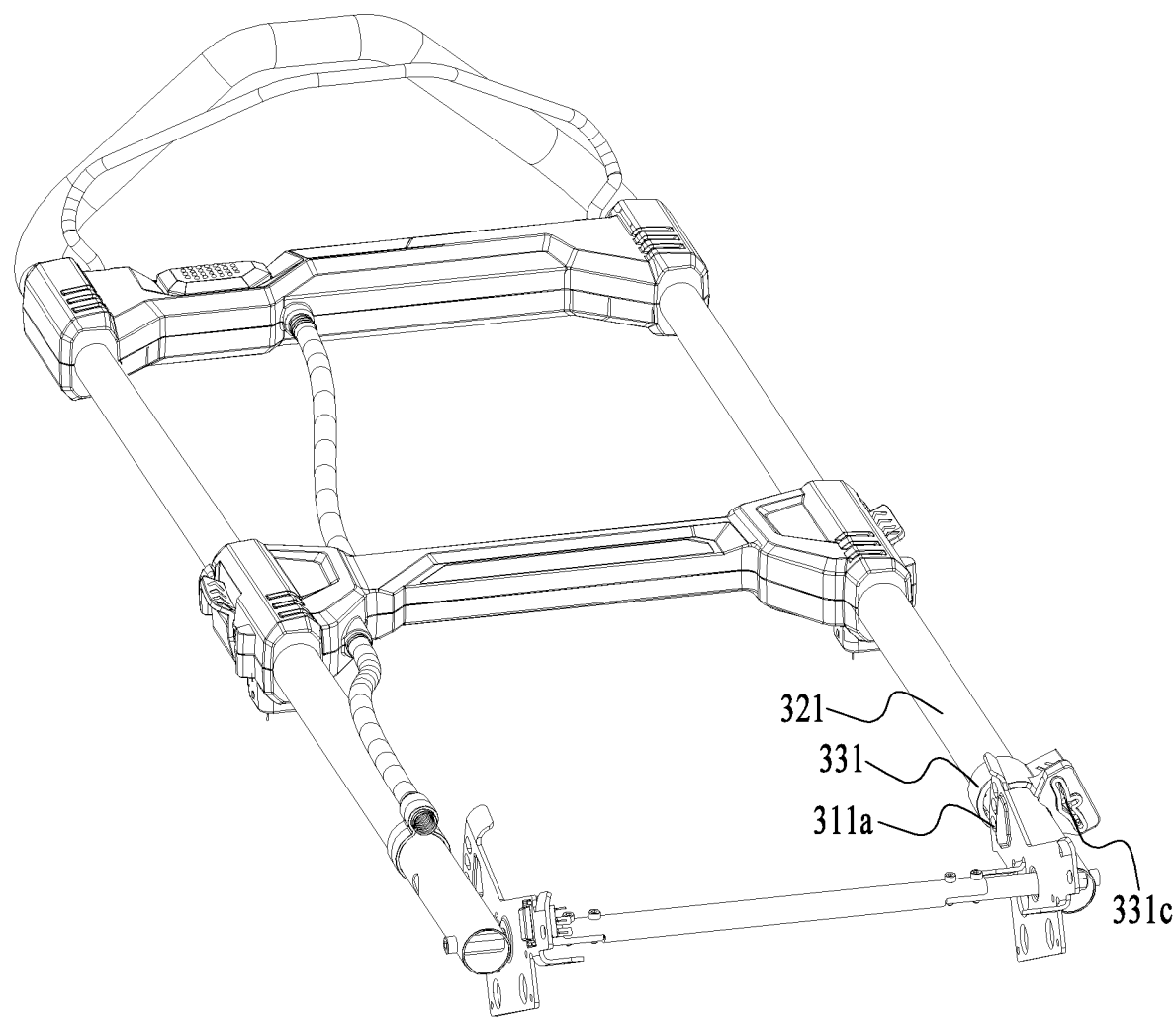
FIG. 13 is a schematic diagram of the portion of the hand-propelled power tool when the adjustment assembly is in an unlocked state according to the third example of FIG. 12.
Figure 14:
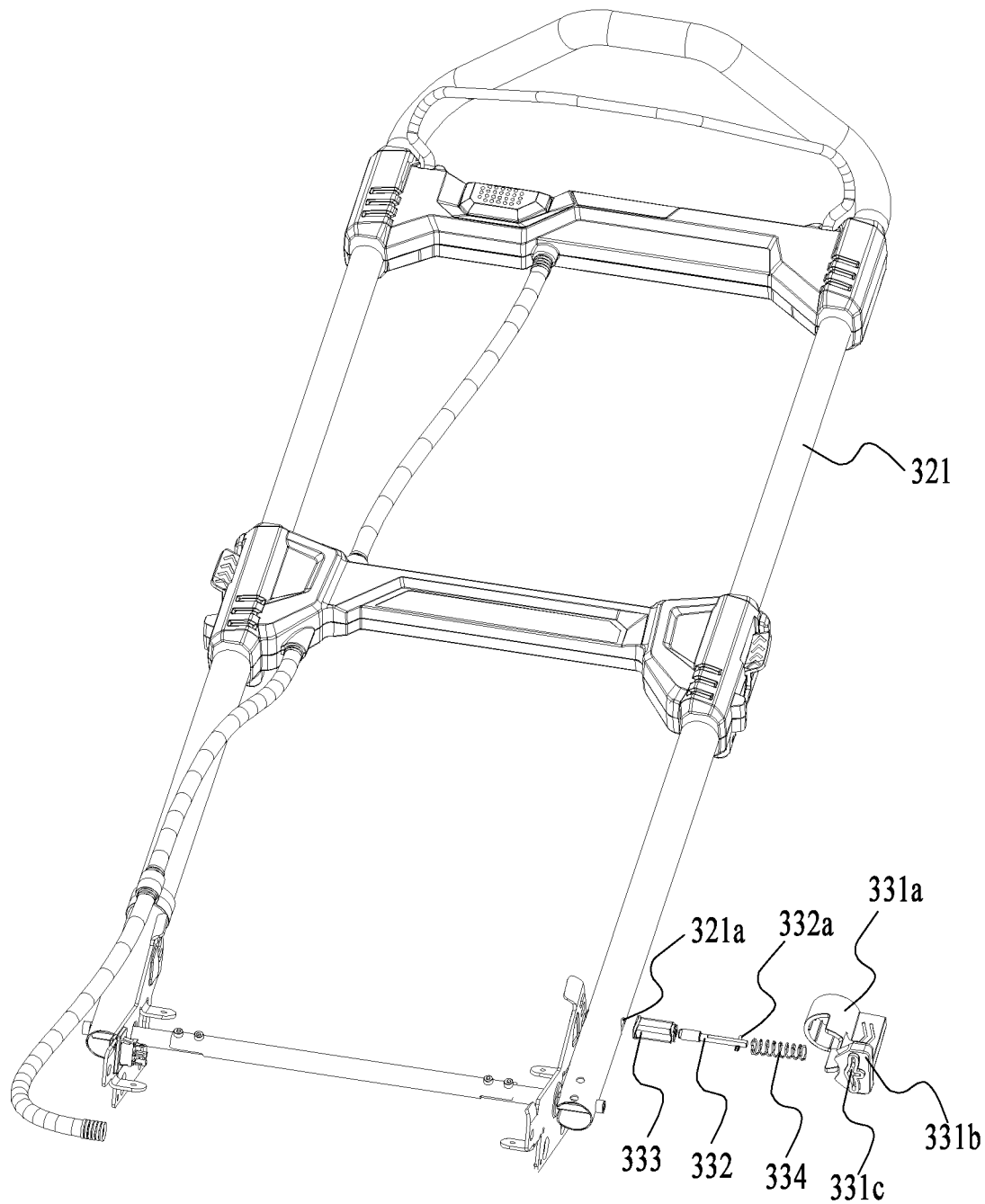
FIG. 14 is a schematic diagram of the portion of the hand-propelled power tool when the adjustment assembly is partially exploded according to the third example of FIG. 12.

FIGS. 12 to 17 illustrate a hand-propelled power tool in a third example, where the hand-propelled power tool also includes the handle device 32 and the main body. FIGS. 12 to 14 illustrate only part of the structure of the handle device 32 and the main body. The hand-propelled power tool in this example is different from the first example in that a structure of the adjustment assembly 33 and an adjustment mode of the adjustment assembly 33 relative to the handle device 32 are different, and similarities with the first example can be applied to this example.

The adjustment assembly 33 is described in detail below. In this example, the adjustment assembly 33 includes an operating piece 331 distributed substantially around the rod body 321. The adjustment assembly 33 further includes a locking pin 332 operative to be engaged with the operating piece 331. The operating piece 331 is formed with an operating portion 331a operable by an operator and a driving portion 331b for driving the locking pin 332 to lock or unlock the rotation of the handle device 32 relative to the main body. The main body is provided with a matching piece 311 operative to be engaged with the locking pin 332. The operating piece 331 includes a through hole through which the rod body 321 can pass, and the operating portion 331a is distributed around a position of the through hole. Specifically, the operating piece 331 is fitted over the rod body 321 and can rotate around the rod body 321, and can switch between a locked position and an unlocked position. The rod body 321 is formed with a first through hole 321a through which the locking pin 332 can pass, and the matching piece 311 is formed with a second through hole 311a through which the locking pin 332 can pass. When the locking pin 332 passes both the first through hole 321a and the second through hole 311a, the handle device 32 is locked to the matching piece 311. When the locking pin 332 is disengaged from the second through hole 311a, the handle device 32 can be freely rotated around the main body, thereby being adjusted to a preset position. It could be understood that the matching piece 311 may be provided with a plurality of second through holes 311a, so that the handle device 32 can be locked at each of a plurality of positions.

The driving portion 331b is disposed on one side of the operating portion 331a, and is formed with a driving groove 331c through which the locking pin 332 can pass. Specifically, the driving groove 331c is perpendicular to both the rod body 321 and the locking pin 332, and is formed with a certain radian. As an implementation, the locking pin 332 is further provided with a driving pin 332a perpendicular to or intersecting with the locking pin 332, and both the locking pin 332 and the driving pin 332a are disposed in the driving groove 331c. When the operating piece 331 moves along the rod body 321, the driving groove 331c can drive the driving pin 332a to slide in the driving groove 331c, and at this time, a movement form of the driving pin 332a is a combined movement of rotating around the rod body 321 and away from the rod body 321, or a combined movement of rotating around the rod body 321 and approaching the rod body 321. It could be understood that a segmental arc of the driving groove 331c enables the driving pin 332a to move away from or approach the rod body 321. In this example, the driving groove 331c includes a first driving groove 331d and a second driving groove 331e substantially symmetrical relative to the locking pin 332. The first driving groove 331d has a same size and function as the second driving groove 331e. The only difference exists only in an operation direction of the operator. That is, when the operator needs to unlock the locking pin 332, the operator 331 may be operated to rotate in the first direction such that the first driving groove 331d drives the locking pin 332 to disengage from the second through hole 311a, or the operator 331 may be operated to rotate in the second direction such that the second driving groove 331e drives the locking pin 332 to disengage from the second through hole 311a.

Figure 15:
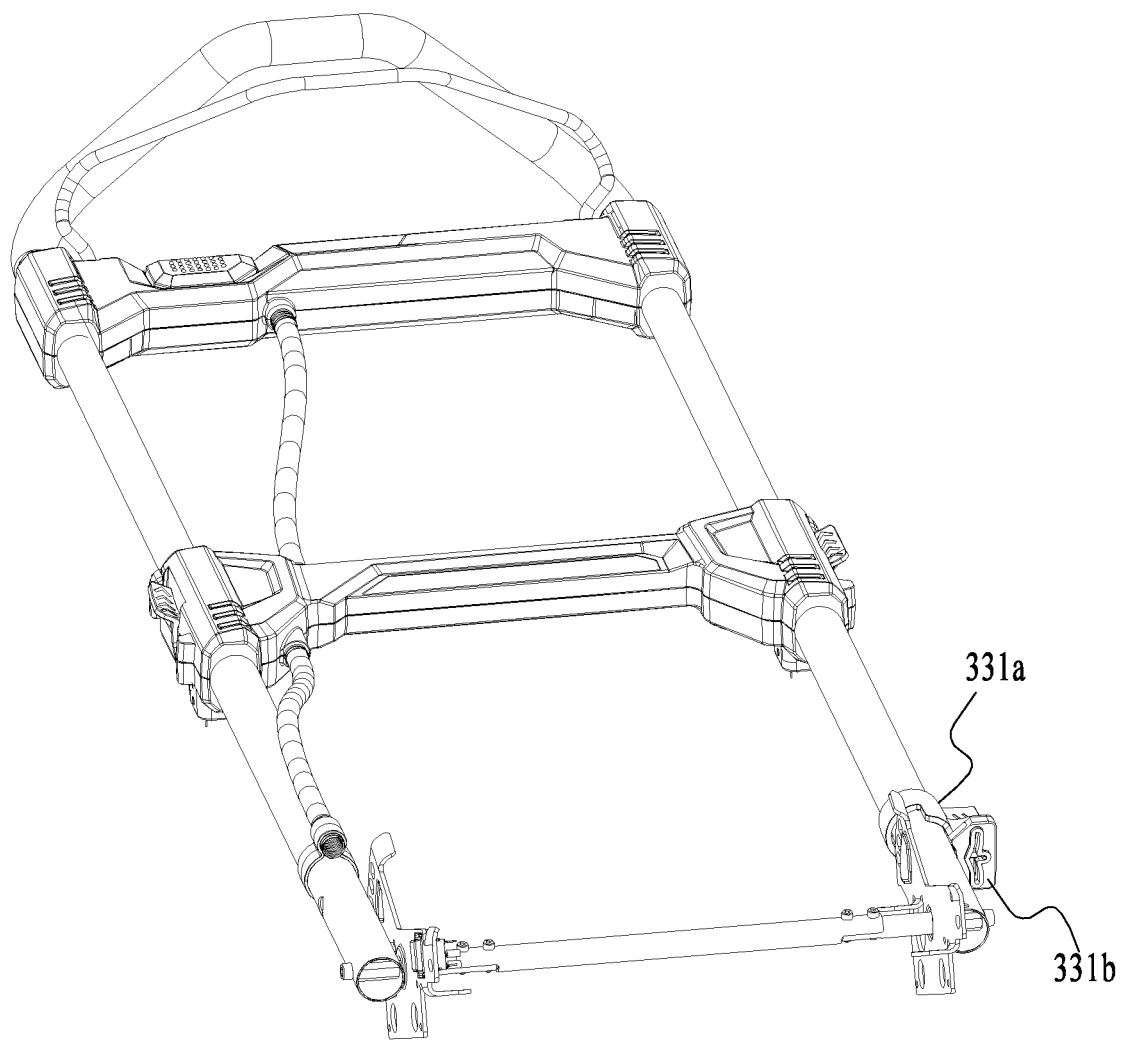
FIG. 15 is a schematic diagram of the portion of the hand-propelled power tool when the adjustment assembly enters a locked state from a free state according to the third example of FIG. 12.
Figure 16:
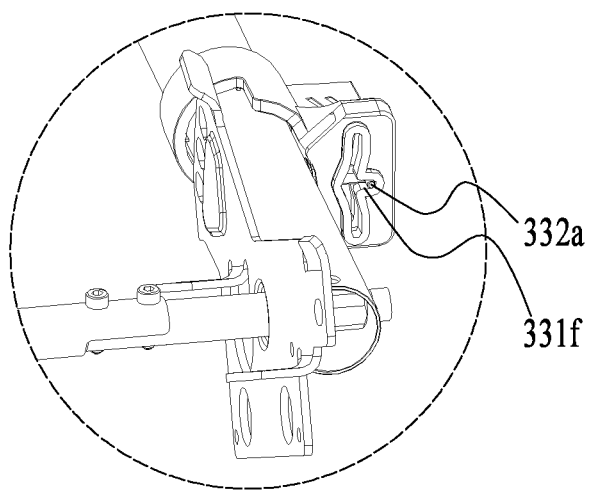
FIG. 16 is an enlarged diagram of a part of the structure of the hand-propelled power tool of FIG. 15.
Figure 17:
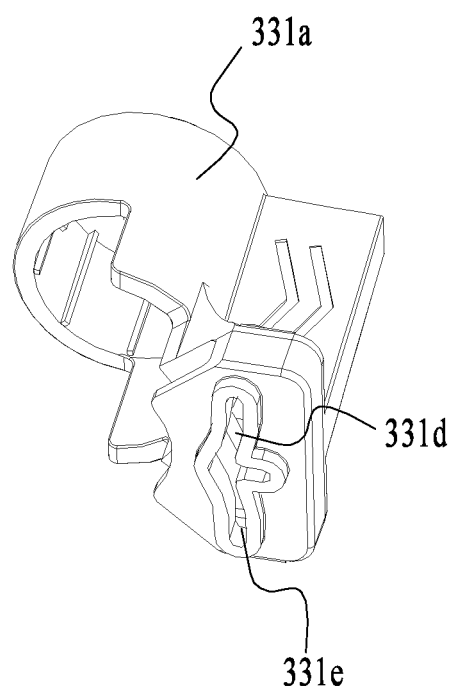
FIG. 17 is a schematic diagram of a operation piece of the adjustment assembly in FIG. 11.

As illustrated in FIG. 15, the operating piece 331 further includes a receiving groove 331f extending in a linear direction substantially parallel to the locking pin 332. The receiving groove 331f may allow the locking pin 332 to move in a direction of its own axis. In this example, a receiving sheath 333 which can be operative to be engaged with the locking pin 332 is further included, the receiving sheath is at least partially disposed in the first through hole 321a, the locking pin 332 is at least partially disposed in the receiving sheath 333, and a third elastic piece 334 is further disposed between the locking pin 332 and the receiving sheath 333. When the locking pin 332 is disengaged from the second through hole 311a, the third elastic piece 334 is compressed, and when the locking pin 332 enters the second through hole 311a, the third elastic piece 334 can release the elastic force such that the locking pin 332 quickly enters the second through hole 311a. It could be understood that the handle device 32 further has a free state away. During a process that the handle device 32 enters a locked state from a free state, the operator does not need to manually unlock the adjustment assembly 33 to make the locking pin 332 enter the second through hole 311a. The matching piece 311 is provided with a guide portion 311b for guiding the locking pin 332 into the second through hole 311a. It could be understood that the guide portion 311b has a smooth and continuous surface, which obliquely intersects a main portion of the matching piece 311, such that the locking pin 332 can be successfully guided into the second through hole 311a. In fact, while the locking pin 332 is guided into the second through hole 311a by the guide portion 311b, the third elastic piece 334 disposed in the receiving sheath 333 is compressed, and at the same time, the drive pin 332a is free to slide in the receiving groove 331f and restricts the locking pin 332 from sliding within its own axis range, preventing the locking pin 332 from deviating from its own axis and being unable to reset into the second through hole 311a. After the locking pin 332 is guided by the guide portion 311b and the third elastic piece 334 is compressed, the locking pin 332 gradually resets and enters the second through hole 311a. During this period, the drive pin 332a is confined in the receiving groove 331f and the locking pin 332 is restricted from deviating from its axis, and at the same time, the third elastic piece 334 releases the elastic force, propelling the locking pin 332 to automatically reset into the second through hole 311a. When the operator needs to readjust a relative position of the handle device 32, the operator can adjust by the adjustment assembly 33.

The foregoing illustrates and describes the basic principles, main features and advantages of the disclosed examples. Those having ordinary skill in the art will appreciate that the foregoing examples will not limit the appended claims in any form, and that any technical solution obtained by means of equivalent replacement or equivalent transformation shall all fall in the scope of protection of the appended claims.

What is claimed is:

1. A hand-propelled power tool, comprising:
   a main body; and
   a handle device connected to the main body;
   wherein the handle device comprises a rod body, connected to the main body, that at least partially extends along a first straight line and an adjustment assembly connected to the rod body comprising an operating piece slidable along the first straight line relative to the rod body; and
   wherein the adjustment assembly has a locked state and an unlocked state relative to the rod body, the operating piece is operative to slide along the rod body to switch the adjustment assembly between the locked state and the unlocked state, when the adjustment assembly is in the unlocked state, the handle device is operative to rotate relative to the main body, toward or away from the main body about an axis substantially perpendicular to the first straight line, and, when the adjustment assembly is in the locked state, the handle device is fixedly connected to the main body.

2. The hand-propelled power tool of claim 1, wherein the adjustment assembly comprises
   connector movably connected to the main body to lock or unlock the rotation of the handle device relative the main body and the operating piece is configured to be operated by a user to drive the connector to move.

3. The hand-propelled power tool of claim 2, wherein the connector is slidably connected to the main body.

4. The hand-propelled power tool of claim 2, wherein the main body is formed with at least two matching portions which are operative to be engaged with the connector.

5. The hand-propelled power tool of claim 2, wherein the adjustment assembly further comprises an elastic piece connected to the connector or to the operating piece.

6. The hand-propelled power tool of claim 2, wherein the operating piece is disposed around the rod body and the operating piece comprises an operating portion for the user to operate and
a driving portion connected to the connector.

7. The hand-propelled power tool of claim 6, wherein the connector is slidable along the first straight line relative the rod body.

8. The hand-propelled power tool of claim 6, wherein the connector is slidable along a second straight line perpendicular to the first straight line relative the rod body.

9. The hand-propelled power tool of claim 1, wherein the hand-propelled power tool is a hand-propelled lawnmower.

10. The hand-propelled power tool of claim 1, wherein the hand-propelled power tool is a hand-propelled snow plow.

11. The hand-propelled power tool of claim 1, wherein the handle device comprises two rod bodies, the adjustment assembly is disposed at one of the two rod bodies, and the handle device further comprises a connecting rod connecting the two rod bodies at ends of the two rod bodies near the main body.

12. A hand-propelled power tool, comprising:
a main body; and
a handle device connected to the main body, wherein the handle device comprises a rod body connected to the main body, that at least partially extends along a first straight line; and
an adjustment assembly connected to the rod body comprising an operating piece slidable relative to the rod body; and
wherein the adjustment assembly has a locked state and an unlocked state relative to the rod body, the operating piece is operative to slide along the rod body to switch the adjustment assembly between the locked state and the unlocked state, when the adjustment assembly is in the unlocked state, the handle device is operative to rotate relative to the main body, toward or away from the main body about an axis substantially perpendicular to the first straight line, and, when the adjustment assembly is in the locked state, the handle device is fixedly connected to the main body.

13. A hand-propelled power tool, comprising:
a main body; and
a handle device connected to the main body;
wherein the handle device comprises a rod body, connected to the main body, that at least partially extends along a first straight line and an adjustment assembly connected to the rod body comprising an operating piece rotatable around the first straight line relative to the rod body; and
wherein the adjustment assembly has a locked state and an unlocked state relative to the rod body, the operating piece is operative to rotate around the first straight line to switch the adjustment assembly between the locked state and the unlocked state, when the adjustment assembly is in the unlocked state, the handle device is operative to rotate relative to the main body, toward or away from the main body about an axis substantially perpendicular to the first straight line, and, when the adjustment assembly is in the locked state, the handle device is fixedly connected to the main body.

14. The hand-propelled power tool of claim 13, wherein the adjustment assembly comprises a locking pin operative to be driven by the operating piece and the operating piece is configured to be operated by a user to drive the locking pin to move to lock or unlock the rotation of the handle device.

15. The hand-propelled power tool of claim 14, wherein the operating piece comprises an operating portion configured to be operated by a user and a driving portion configured to drive the locking pin to move and the rod body is provided with a first through hole through which the locking pin is operative to pass.

16. The hand-propelled power tool of claim 15, wherein the main body comprises a matching piece provided with a second through hole operative to be engaged with the locking pin.

17. The hand-propelled power tool of claim 16, wherein the adjustment assembly further comprises a driving pin connected to the locking pin, the driving portion is provided with a driving groove for accommodating the driving pin, an extending direction of the driving pin is perpendicular to a extending direction of the locking pin, and the driving groove drives the driving pin to move to drive the locking pin to move when the operating piece rotates relative the rod body.

18. The hand-propelled power tool of claim 15, wherein the adjustment assembly further comprises a receiving sheath operative to be fitted with the locking pin, the receiving sheath is at least partially disposed in the first through hole, and an elastic piece is disposed between the locking pin and the receiving sheath.

19. The hand-propelled power tool of claim 13, wherein at least a portion of the operating piece distributes around the rod body.

20. The hand-propelled power tool of claim 13, wherein the handle device comprises two rod bodies, the adjustment assembly is disposed at one of the two rod bodies, and the handle device further comprises a connecting rod connecting the two rod bodies at ends of the two rod bodies near the main body.

* * * * *